United States Patent
Kobayashi

(10) Patent No.: US 8,291,343 B2
(45) Date of Patent: Oct. 16, 2012

(54) DISPLAY CONTROL APPARATUS, DISPLAY CONTROL METHOD, AND PROGRAM

(75) Inventor: Arito Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 11/516,202

(22) Filed: Sep. 6, 2006

(65) Prior Publication Data

US 2007/0061757 A1    Mar. 15, 2007

(30) Foreign Application Priority Data

Sep. 8, 2005    (JP) .................................. 2005-260309

(51) Int. Cl.
*G09G 5/00* (2006.01)
*G06F 3/00* (2006.01)
*G06F 3/048* (2006.01)

(52) U.S. Cl. ........................... 715/810; 725/37; 715/825
(58) Field of Classification Search .................. 715/810, 715/828, 825; 725/37
See application file for complete search history.

(56) References Cited

U.S. PATENT DOCUMENTS

| | | | | |
|---|---|---|---|---|
| 5,883,621 A | * | 3/1999 | Iwamura | 725/37 |
| 6,118,450 A | * | 9/2000 | Proehl et al. | 715/810 |
| 7,367,028 B2 | * | 4/2008 | Kodosky et al. | 715/748 |
| 2002/0122068 A1 | * | 9/2002 | Tsuruoka | 345/810 |
| 2002/0174270 A1 | * | 11/2002 | Stecyk et al. | 710/1 |
| 2003/0107605 A1 | * | 6/2003 | Iwamura | 345/810 |
| 2005/0159832 A1 | * | 7/2005 | Umeo et al. | 700/94 |
| 2007/0229465 A1 | * | 10/2007 | Sakai et al. | 345/173 |
| 2009/0300620 A1 | * | 12/2009 | Park et al. | 718/100 |

FOREIGN PATENT DOCUMENTS

| | | |
|---|---|---|
| JP | 10 171621 | 6/1998 |
| JP | 2001 256153 | 9/2001 |
| JP | 2004 356774 | 12/2004 |
| JP | 2005 165767 | 6/2005 |
| JP | 2005 174063 | 6/2005 |

OTHER PUBLICATIONS

Reedy, Sarah; To IPTV and Beyond; Mar. 17, 2008; Telephony, . p. 28-29.*

* cited by examiner

*Primary Examiner* — Jordany Nunez
(74) *Attorney, Agent, or Firm* — Frommer Lawrence & Haug LLP; William S. Frommer; Thomas F. Presson

(57) ABSTRACT

A display control apparatus is disclosed which includes: an application configured to display a plurality of first icons each representing a category; and a plurality of plug-ins each of which is assigned items represented by second icons; wherein one of the plurality of plug-ins associates the items assigned thereto with a plurality of categories; and wherein, if one of the categories represented by the first icons is selected and if the selected category is found associated with the items assigned to the one plug-in, then that one plug-in displays the second icons representing the items belonging to the selected category.

6 Claims, 13 Drawing Sheets

DISPLAY CONTROL APPARATUS, DISPLAY CONTROL METHOD, AND PROGRAM

CROSS REFERENCES TO RELATED APPLICATIONS

The present invention contains subject matter related to Japanese Patent Application JP 2005-260309 filed with the Japanese Patent Office on Sep. 8, 2005, the entire contents of which being incorporated herein by reference.

BACKGROUND OF THE INVENTION

1. Field of the Invention

The present invention relates to a display control apparatus, a display control method, and a program. More particularly, the invention relates to a display control apparatus, a display control method, and a program for associating the items represented by icons and assigned to one of plug-ins with a plurality of categories.

2. Description of the Related Art

Recent years have witnessed extensive marketing of consumer electronic appliances each capable of handling a variety of media through the use of matching functions. These functions include one that receives broadcast programs, records the received programs onto an internal HDD (hard disk drive) and reproduces them therefrom; one that reproduces music and still images from the HDD; one that reproduces music and still images from a memory card inserted into a slot on the appliance enclosure; and one that carries out programs retrieved from a DVD (digital versatile disc) to let users play games. Among the electronic appliances, there exist some that provide a menu screen showing category-specific icons arrayed laterally allowing the user to select any one of the matching functions, the menu screen further showing a vertical array of items subsumed under the currently selected category. One such apparatus is disclosed illustratively in "SONY WEGA: EXPERIENCE! XMB" (looked up on the Internet on Aug. 31, 2005, at http:/www.sony.jp/products/Consumer/wega/xmb/index.html).

The categories into which to classify items illustratively include: "Video" for recording programs and reproducing the recorded programs; "Photo" for reproducing still images; "Music" for reproducing music; and "Games" for letting the user play video games.

The display of the above type of menu screen is brought about by an application program which controls the display of an entire menu screen and which incorporates plug-ins for implementing functions and for displaying icons representative of these functions.

For example, if the category of "Video" is selected, the icons representing devices that record programs are displayed on the menu screen by the plug-in that carries out the recording of programs or reproduction of recorded programs.

SUMMARY OF THE INVENTION

Heretofore, typical apparatuses displaying the above-described type of menu screen were capable of letting each of the plug-ins display an icon or icons that represent one or a plurality of items falling under only one category.

Illustratively, among the plug-ins offered by the apparatus is one that implements the function of external devices connected by an IEEE 1394 cable (called the IEEE 1394 plug-in hereunder). Where the category of "External input" is provided, the icons representing the external devices controlled by the IEEE 1394 plug-in are all shown to fall under the "External input" category.

It follows that if the external devices connected by an IEEE 1394 cable each are a hard disk recorder (HDR) and a tuner device (e.g., for receiving CS (communications satellite) digital broadcasts), the icons indicating these devices are all shown to fall under the same category of "External input." Whereas the icon representative of the tuner device falling under the "External input" category may be perceived as only natural, the icon of the HDR shown under the same category may not be recognized intuitively by the user. That is because the HDR, a device capable of recording broadcast programs and reproducing them, may well be classified into the category of "Video" instead of being subsumed under the category of "External input."

The present invention has been made in view of the above circumstances and provides arrangements for letting items assigned to any given plug-in be associated with a plurality of categories.

In carrying out the present invention and according one embodiment thereof, there is provided a display control apparatus including: an application configured to display a plurality of first icons each representing a category; and a plurality of plug-ins each of which is assigned items represented by second icons. One of the plurality of plug-ins associates the items assigned thereto with a plurality of categories. If one of the categories represented by the first icons is selected and if the selected category is found associated with the items assigned to that one plug-in, then that one plug-in displays the second icons representing the items belonging to the selected category.

Preferably, if the plurality of first icons are displayed in an array in a given direction by the application, then that one of the plurality of plug-ins may display the second icons in an array in the direction perpendicular to the direction in which the first icons are arrayed on the display.

Preferably, if the items assigned to that one of the plurality of plug-ins represent external devices connected via an IEEE 1394 cable each, then that one plug-in may associate the item of a first external device capable of reproducing contents with a first category covering content reproduction, and associate the item of a second external device incapable of reproducing contents with a second category covering other external devices.

Preferably, if a third category represented by one of the first icons is added to cover the external devices connected via an IEEE 1394 cable each, then that one plug-in may associate the items of the first and the second external devices with the third category.

According to another embodiment of the present invention, there is provided a display control method for use with a display control apparatus having an application configured to display a plurality of first icons each representing a category, and a plurality of plug-ins each of which is assigned items represented by second icons. The display control method includes the steps of: causing one of the plurality of plug-ins to associate the items assigned thereto with a plurality of categories; and if one of the categories represented by the first icons is selected and if the selected category is found associated with the items assigned to that one plug-in, then causing that one plug-in to display the second icons representing the items belonging to the selected category.

According to a further embodiment of the present invention, there is provided a program for causing a computer to carry out a procedure for controlling a display control apparatus having an application configured to display a plurality of first icons each representing a category, and a plurality of plug-ins each of which is assigned items represented by second icons. The procedure includes the steps of: causing one of the plurality of plug-ins to associate the items assigned thereto with a plurality of categories; and if one of the categories represented by the first icons is selected and if the selected category is found associated with the items assigned to that one plug-in, then causing that one plug-in to display the second icons representing the items belonging to the selected category.

Where the program control apparatus, program control method, and program according to the embodiment of the present invention are in use, one of the plurality of plug-ins associates the items assigned thereto with a plurality of categories. If one of the categories represented by the first icons is selected and if the selected category is found associated with the items assigned to that one plug-in, then that one plug-in displays the second icons representing the items belonging to the selected category.

According to the present invention, any one of the embodiments outlined above is capable of associating the items assigned to a given plug-in with a plurality of categories.

DETAILED DESCRIPTION OF THE PREFERRED EMBODIMENTS

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

One preferred embodiment of the present invention is a display control apparatus (e.g., DIV 1 in FIG. 1) including: an application (e.g., menu screen display application 101 in FIG. 6) configured to display a plurality of first icons (category icons) each representing a category; and a plurality of plug-ins (e.g., setting plug-in 111 through other plug-ins 116 in FIG. 6) each of which is assigned items represented by second icons. One of the plurality of plug-ins (e.g., IEEE 1394 plug-in 115 in FIG. 6) associates the items (e.g., HDR, DVHS, and tuner device) assigned thereto with a plurality of categories (e.g., "Video" and "External input"). If one of the categories represented by the first icons is selected and if the selected category is found associated with the items assigned to that one plug-in, then that one plug-in displays the second icons (item icons) representing the items belonging to the selected category.

Other preferred embodiments of the present invention include a display control method and a computer program, wherein the method or the procedure controlled by the program includes the steps of: causing one of the plurality of plug-ins to associate the items assigned thereto with a plurality of categories; and if one of the categories represented by the first icons is selected and if the selected category is found associated with the items assigned to that one plug-in, then causing (i.e., in step S14 of FIG. 8) that one plug-in to display the second icons representing the items belonging to the selected category.

Figure 1:
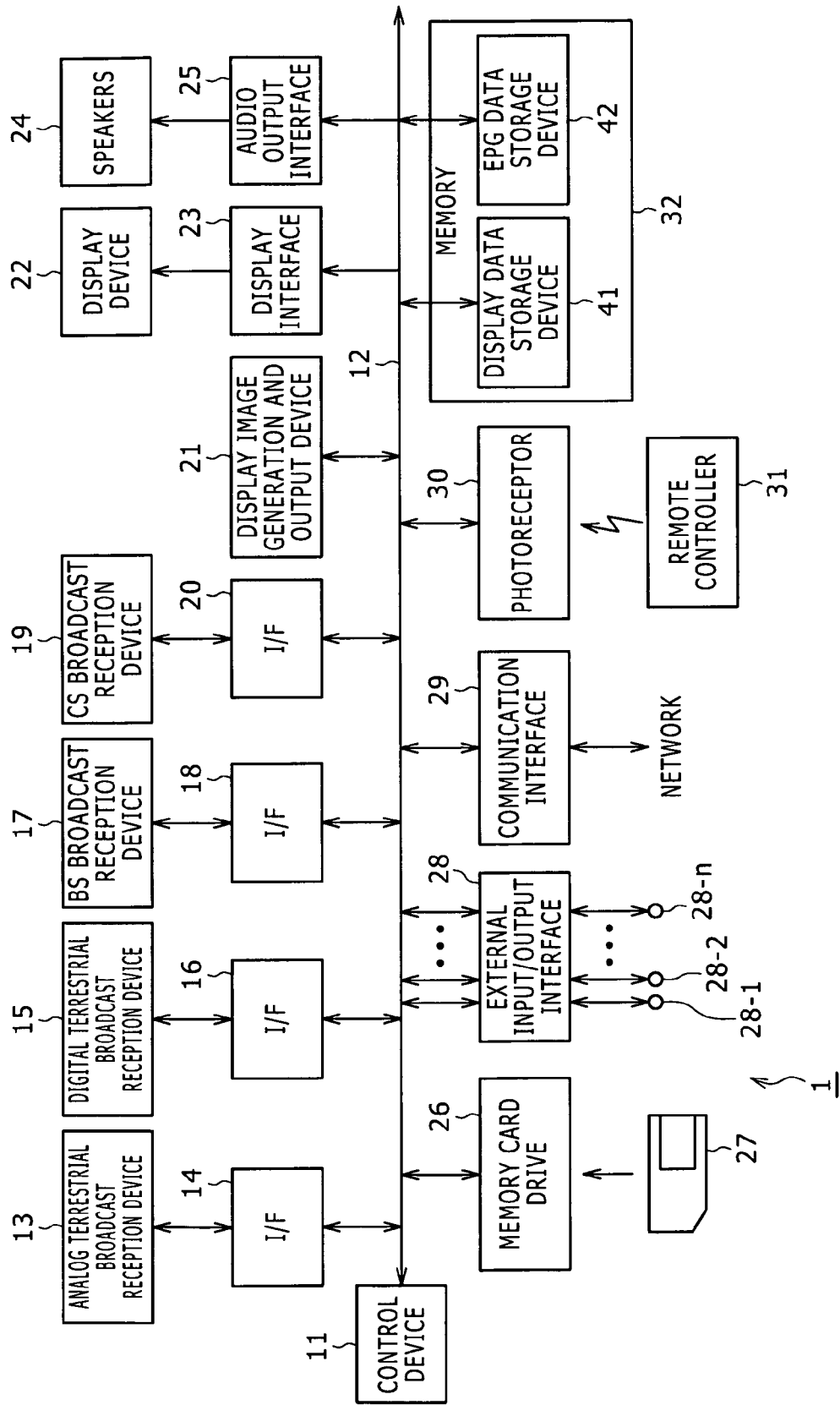
FIG. 1 is a block diagram showing a typical structure of a digital television (DTV) embodying the present invention.

The preferred embodiments of the present invention will now be described in more detail with reference to the accompanying drawings. FIG. 1 is a block diagram showing a typical structure of a digital television 1 (DTV) practiced as one embodiment of the present invention.

The DTV 1 is made up of various processing devices connected via a bus 12 to a control device 11. The control device 11 includes a CPU (central processing unit), a ROM (read only memory), and a RAM (random access memory).

An analog terrestrial broadcast reception device 13 receives analog terrestrial TV broadcast signals under control of the control device 11. The received signal is demodulated into a video signal and an audio signal which are output onto the bus 12 via an interface 14. The user's operations on a remote controller 31 cause the control device 11 to give the analog terrestrial broadcast reception device 13 instructions to receive the user-selected channel. Other broadcast reception devices are also given instructions by the control device 11 reflecting the user's operations.

A digital terrestrial broadcast reception device 15 addressing digital TV and data broadcasts receives digital terrestrial broadcast signals under control of the control device 11. In operation, the digital terrestrial broadcast reception device 15 decodes the received broadcast signal into a video signal and an audio signal making up the received program as well as EPG (electronic program guide) data, and outputs the resulting signals and data onto the bus 12 via an interface 16.

A BS (broadcasting satellite) broadcast reception device 17 addressing BS TV, radio and data broadcasts receives BS digital broadcast signals under control of the control device 11. In operation, the BS broadcast reception device 17 decodes the received broadcast signal into a video signal and an audio signal making up the received program as well as EPG data, and outputs the resulting signals and data onto the bus 12 via an interface 18.

A CS (communications satellite) broadcast reception device 19 addressing CS TV, radio and data broadcasts receives CS digital broadcast signals under control of the control device 11. In operation, the CS broadcast reception device 19 decodes the received broadcast signal into a video signal and an audio signal making up the received program as well as EPG data, and outputs the resulting signals and data onto the bus 12 via an interface 20.

A display image generation and output device 21 under control of the control device 11 causes a display device 22 to display diverse images. Illustratively, the display image generation and output device 21 causes the display device 22 to display program images based on image data supplied from the analog terrestrial broadcast reception device 13, digital terrestrial broadcast reception device 15, BS broadcast reception device 17, and CS broadcast reception device 19 over the bus 12. The sound of the program is output from speakers 24 under control of the control device 11 in synchronized relation with the program images being displayed by the display image generation and output device 21.

The display image generation and output device 21 has an OSD (on-screen display) function. Under control of the control device 11, this function causes the display device 22 to display the menu screen as a GUI (graphical user interface) for allowing the user to make various operations on the DTV 1. A display data storage device 41 in a memory 32 accommodates data constituting icons (letters and symbols) that appear on the menu screen.

When notified by the control device 11 that an operation has been performed by the user on the menu screen, the display image generation and output device 21 changes menu screen indications accordingly.

The display device 22 is illustratively constituted by an LCD (liquid crystal display). Given control instructions from the display image generation and output device 21 through the bus 12 and a display interface 23, the display device 22 displays program images and menu screens. The menu screens appearing on the display device 22 will be described later in detail.

The speakers 24 under control of the control device 11 output sounds corresponding to the audio data supplied from the analog terrestrial broadcast reception device 13, digital terrestrial broadcast reception device 15, BS broadcast reception device 17, and CS broadcast reception device 19 through the bus 12 and an audio output interface 25.

A memory card drive 26 performs data write and read operations to and from a memory card 27 inserted into a slot formed on the enclosure of the DTV 1. From the memory card 27, the memory card drive 26 may retrieve data constituting still images taken illustratively by a digital camera. The retrieved data is output to the display image generation and output device 21 over the bus 12. The display image generation and output device 21 displays still images based on the data retrieved from the memory card 27.

An external input/output interface 28 exchanges data (i.e., signals) with devices each connected by a cable to such external input/output terminals 28-1 through 28n as video input/output terminals, audio input/output terminals, USB (universal serial bus) terminals, IEEE (Institute of Electrical and Electronic Engineers) 1394 terminals, and HDMI (High-Definition Multimedia Interface) terminals.

Illustratively, if a digital camera or an audio player is connected to the DTV 1 via a USB cable, the external input/output interface 28 acquires the still image data captured by the digital camera or the audio data held in the audio player. Where a hard disk recorder (HDR) is connected to the DTV 1 via an IEEE 1394 cable, the external input/output interface 28 outputs digital broadcast program data (video and audio signals) obtained by the digital terrestrial broadcast reception device 15 to the HDR for storage through the IEEE 1394 cable. The external input/output interface 28 further acquires program data from the HDR through the IEEE 1394 cable and outputs the acquired data to the display image generation and output device 21 whereby program images are displayed.

A communication interface 29 serves to exchange data with other apparatuses over the network. For example, if the DTV 1 is connected to a network-compatible recording and reproducing apparatus over the network, the communication interface 29 sends the digital broadcast program data obtained by the digital terrestrial broadcast reception device 15 to the recording and reproducing apparatus for storage. The communication interface 29 further outputs the program data sent from the recording and reproducing apparatus over the network to the display image generation and output device 21 whereby program images are displayed.

A photoreceptor 30 receives infrared rays from the remote controller 31, demodulates the received rays into signals reflecting the user's operations, and outputs the resulting signals to the control device 11 through the bus 12. The remote controller 31 has arrow keys and an enter key, as well as a home key that may be operated to display a menu screen.

The memory 32 is illustratively composed of a flash memory that incorporates the display data storage device 41 and an EPG data storage device 42. The display data storage device 41 stores data constituting icons as part of the menu screen. The EPG data storage device 42 holds EPG data obtained by the analog terrestrial broadcast reception device 13, digital terrestrial broadcast reception device 15, BS broadcast reception device 17, and CS broadcast reception device 19. The EPG data includes such information as the names of program broadcasting stations (i.e., channel names), program titles, broadcast starting and ending times of programs, performers and personalities that appear in programs, and program genres. These items of information are used to display program listings. Alternatively, EPG data may be downloaded from a suitable server through the communication interface 29 and stored into the EPG data storage device 42 for subsequent use in displaying program listings.

Figure 2:
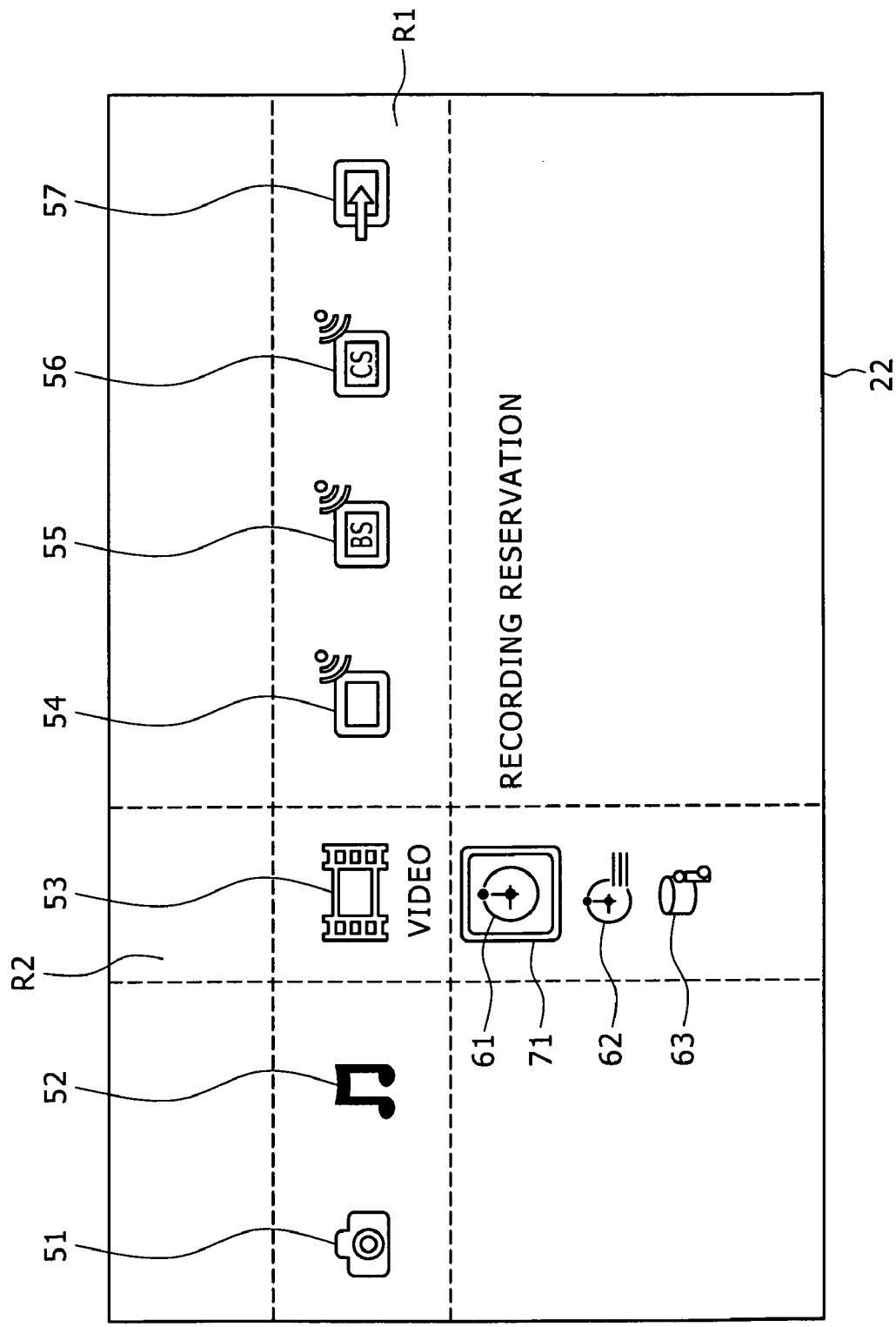
FIG. 2 is a schematic view of a typical menu screen.

What follows is an explanation of the menu screen displayed by the DTV 1 structured as described above. FIG. 2 is a schematic view of a typical menu screen.

The menu screen shown in FIG. 2 is displayed illustratively when the user operates the home key on the remote controller 31. On this screen, the user may select the type of broadcast wave (satellite, terrestrial, etc.), desired programs broadcast on the selected type of wave, and any of various functions available with the DTV 1. It should be noted that dotted lines in FIG. 2 are added there for purpose of explanation and do not actually appear on the menu screen.

The menu screen has a category icon array R1 and an item icon array R2 crossing each other in a position slightly above and on the left of the screen center. The category icon array R1 is formed by a plurality of category icons arrayed in a line. The item icon array R2 is made up of item icons arrayed also in a line, the icons representing the items that belong to the category currently selected from the category icon array R1.

Illustratively, the category icon array R1 may be displayed in the horizontal direction (crosswise) of the display device 22 and the item icon array R2 in the vertical direction (lengthwise) crossing the array R1 at right angles as shown in FIG. 2. The data constituting these arrays is stored in the display data storage device 41.

The category icon array R1 is constituted by the icons illustratively representing nine categories. Each category will be discussed later in detail. Among the icons in the example of FIG. 2 are a photo icon 51 that stands for the category of "Photo," a music icon 52 for the category of "Music," a video icon 53 for the category of "Video," a terrestrial broadcast icon 54 for the category of "Terrestrial broadcast," a BS broadcast icon 55 for the category of "BS broadcast," a CS broadcast icon 56 for the category of "CS broadcast," and an external input icon 57 for the category of "External input."

When the user operates the remote controller 31 to switch display ranges, the menu screen may further display a setting icon representative of the category of "Settings," and a network icon denoting the category of "Network."

In the example of FIG. 2, the video icon 53 is shown selected from among the category icons arrayed horizontally. The selected video icon 53 appears slightly larger than the other category icons. Under the video icon 53 is the word "Video" indicating that the video category is currently selected.

Also in FIG. 2, item icons 61 through 63 are displayed as the icons representing the items that are subsumed under the video category selected by the user. The number of subsumed items varies from one category to another. The menu screen displays a predetermined number of icons for each selected category as shown in FIG. 2.

The item icon 61 stands for the item selected in order to set recording reservations. The item icon 62 denotes the item selected to verify recording reservations. The item icon 63 represents the HDR connected to the DTV 1 through an IEEE 1394 cable. Selecting the item icon 63 allows the user to reproduce recorded programs from the HDR.

The HDR connected to the DTV 1 through the IEEE 1394 cable is an external device. Usually, the icons representative of external devices are displayed (with the external input icon 57 selected) to show that the devices represented thereby belong to the category of "External input." However, the icon of the HDR capable of reproducing recorded programs is displayed in a manner indicating that the device belongs not to the category of "External input" but to the category of "Video."

In the example of FIG. 2, the item icon 61 is shown selected from among the icons 61 through 63, the selected icon being encircled by a cursor 71. To the right of the item icon 61 appears the phrase "Recording reservation" indicating that recording reservations may be set when this icon is selected.

On the menu screen outlined above, the user may primarily operate the right and left keys on the remote controller 31 to select a desired category and the up and down keys to select a desired item belonging to the selected category.

The user's operations in the horizontal direction cause the whole category icons constituting the category icon array R1 to move collectively. Likewise the user's operations in the vertical direction cause the entire item icons making up the item icon array R2 to move collectively.

For example, suppose that the user pushes the left key once in the state of FIG. 2 where the "video" category is selected. In that case, the whole category icons constituting the category icon array R1 are shifted rightward in such a manner that the music icon 52 comes into the position where the video icon 53 was shown and the photo icon 51 into the position where the music icon 52 appeared. Into the position occupied so far by the photo icon 51 comes illustratively the setting icon representing the category of "Settings." The setting icon is located illustratively on the left of the photo icon 51 in the category icon array R1.

Similarly, the video icon 53 comes into the position where the terrestrial broadcast icon 54 was displayed, the terrestrial broadcast icon 54 into the position where the BS broadcast icon 55 appeared, the BS broadcast icon 55 into the position where the CS broadcast icon 56 was shown, and the CS broadcast icon 56 into the position where the external input icon 57 was displayed. The external input icon 57 shown in the rightmost position in FIG. 2 now disappears.

This is the state where the category of "Music" is selected in place of the category of "Video." The item icons representing the items belonging to the "Music" category are displayed vertically in the item icon array R2.

If the user pushes the right key once in the state of FIG. 2, the entire category icons constituting the category icon array R1 are shifted leftward in a manner opposite to what took place when the user pushed the left key once above. In this case, the item icons representing the items belonging to the category of "Terrestrial broadcast" are displayed in the vertical direction as the item icon array R2.

Suppose now that the user pushes the down key once in the state of FIG. 2. In such a case, the entire item icons constituting the item icon array R2 are shifted upward so that the item icon 61 appears above the video icon 53 and the item icon 62 comes into the position where the item icon 61 was shown. At this point appears the phrase "Reservation verification" next to the cursor 71. The phrase indicates that the item icon 62 is selected in order to verify recording reservations.

Also in the state of FIG. 2, the item icon 63 now comes into the position where the item icon 62 was displayed and a new item icon into the position where the icon 63 was shown. The newly introduced item icon, another part of the item icon array R2, was hidden under the item icon 63.

If the user pushes the up key once in the state of FIG. 2, the user's operation is considered illustratively invalid and the display remains unchanged. This is because there is no more item icon coming above the item icon 61 as another part of the item icon array R2.

Figure 3:
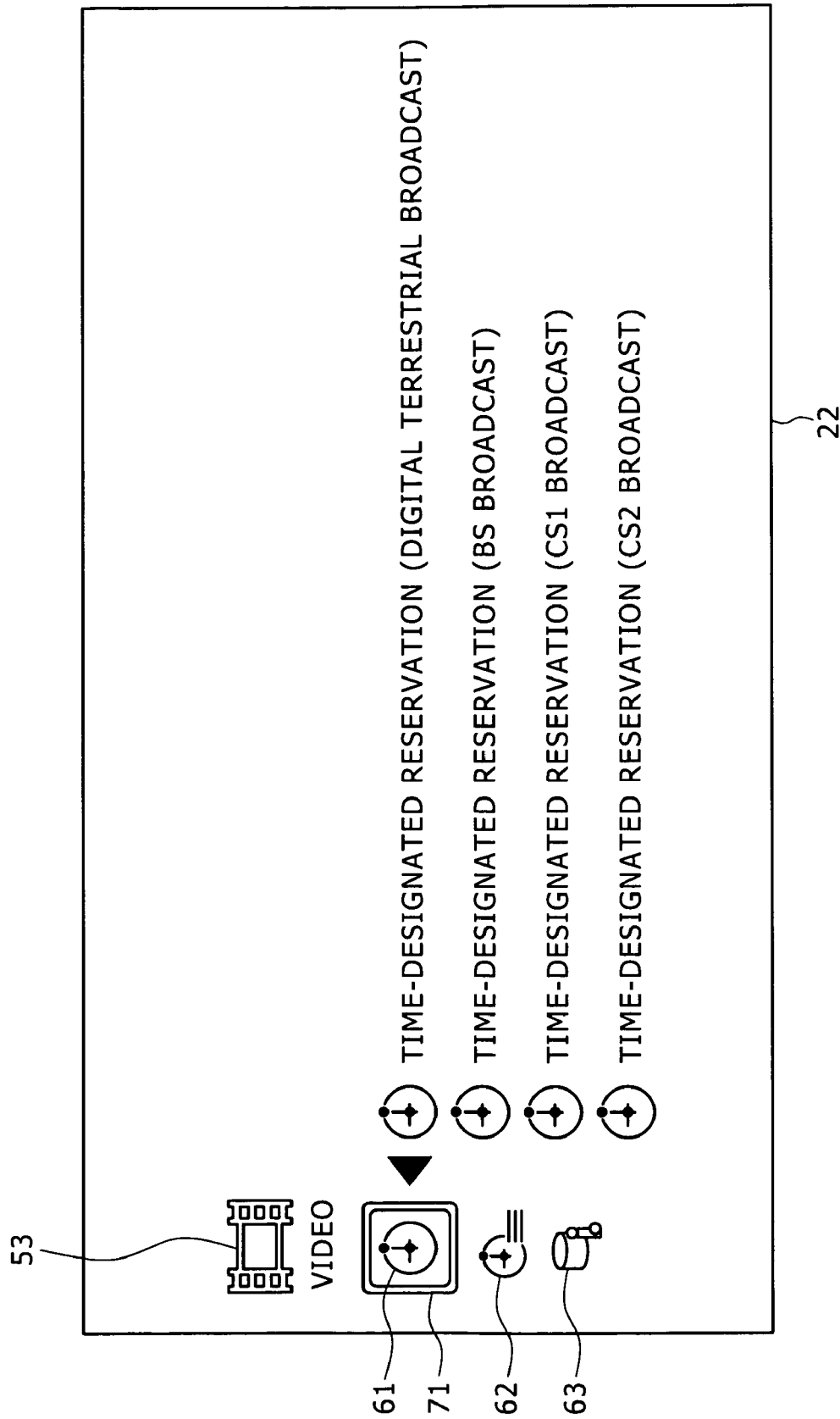
FIG. 3 is a schematic view of another typical menu screen.

FIG. 3 is a schematic view of another typical menu screen. With the item of "Recording reservation" selected from among the items belonging to the category of "Video" in the state of FIG. 2, the enter key on the remote controller 31 may be operated. In that case, the screen of FIG. 2 is switched over to another screen shown in FIG. 3. On the screen after the switchover appear the icons representing the items defined as subsumed under the category of "Recording reservation" the icons being arrayed in the vertical direction. Next to each icon is a phrase that explains the corresponding item.

The example of FIG. 3 shows four icons accompanied by explanatory phrases: one icon stands for the item for designating the time slot in which to record a digital terrestrial broadcast program; another icon represents the item for designating the time slot in which to record a BS digital broadcast program; another icon denotes the item for designating the time slot in which to record a CS digital broadcast (CS1) program; and another icon indicates the item for designating the time slot in which to record another CS digital broadcast (CS2) program.

By selecting any one of the vertically arrayed items, the user can designate the time slot in which to record a program on a desired type of broadcast wave. Illustratively, the cursor 71 is displayed in such a manner as to select the item which represents terrestrial digital broadcast and which appears as the topmost of the items subsumed under the category. The user may switch the items to be selected by operating the up and down keys. Pushing the enter key finalizes selection of the desired item.

In the example of FIG. 3, all category icons making up the category icon array R1 are shown to have disappeared from the screen except for the currently selected video icon 53. The item icon array R2 is moved to the leftmost position of the screen. In the vacated display area appear the icons and their accompanying phrases explanatory of the subsumed items.

Figure 4:
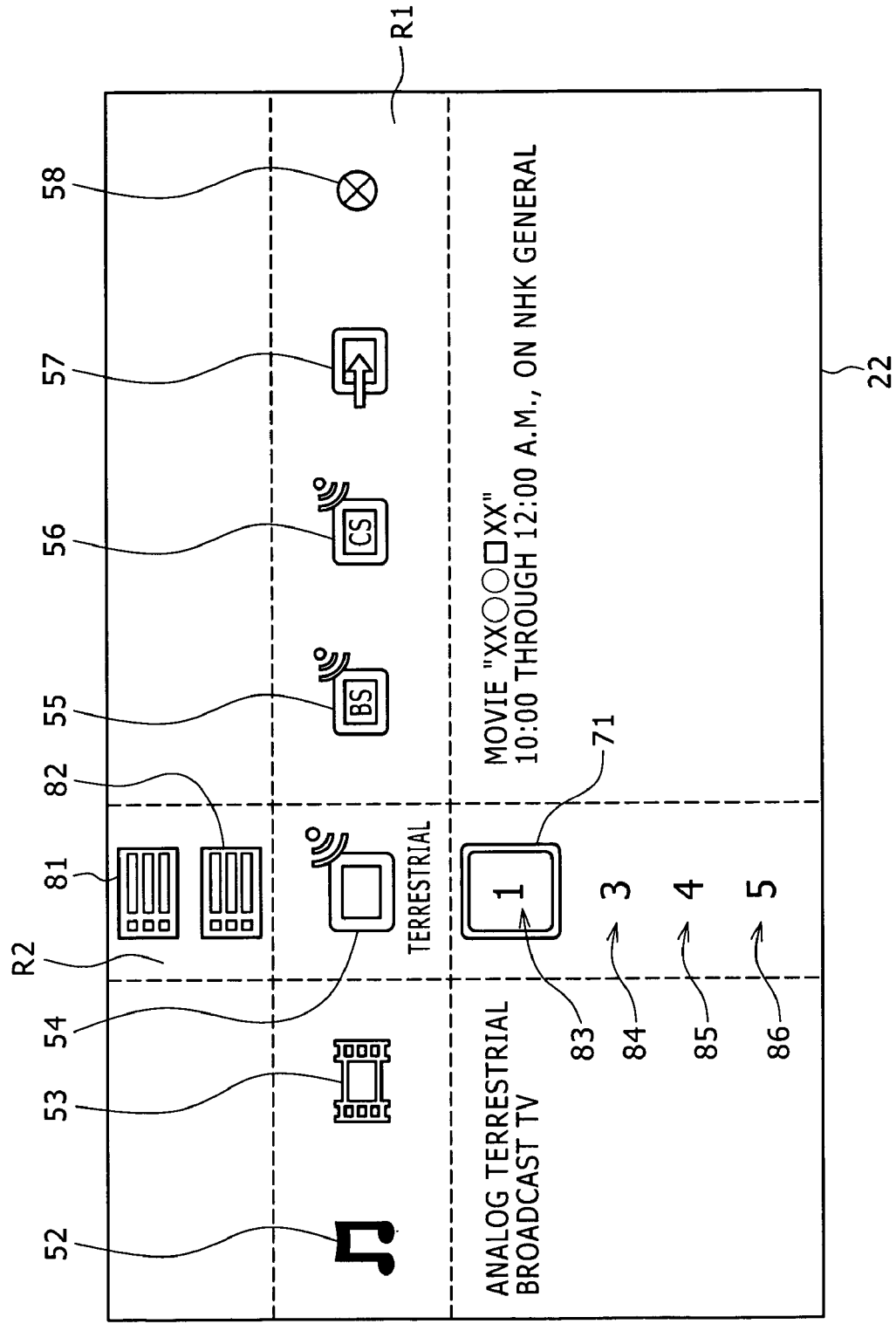
FIG. 4 is a schematic view of another typical menu screen.

FIG. 4 is a schematic view of another typical menu screen. With the "Video" category selected from the category icon array R1 in the state of FIG. 2, the right key may be pushed once. In that case, the "Terrestrial broadcast" category is selected as shown in FIG. 4. The item icons representing the items subsumed under this category are displayed in the vertical direction.

In the example of FIG. 4, the terrestrial broadcast icon 54 is shown sandwiched by item icons 81 and 82 from above and by channel icons 83 through 86 from below.

The item icon 81 stands for the item selected in order to display the listings of analog terrestrial broadcast programs. The item icon 82 represents the item selected to display the listings of digital terrestrial broadcast programs. The channel icons 83 through 86 stand for channels designated by the numbers added as shown (channels 1, 3, 4. 5).

The user may switch the items to be selected by pushing the up and down keys in a manner suitably positioning the cursor 71. With the desired item selected, pushing the enter key enables the user either to have program listings displayed or to view the program currently broadcast on the selected channel depending on what has been selected.

In the example of FIG. 4, channel 1 is shown selected. On the left of the cursor 71 appears the phrase "Analog terrestrial broadcast TV" indicating a "group" to which the selected channel belongs. The "Terrestrial broadcast" category includes an "analog terrestrial broadcast TV" group (i.e., group of programs received by the analog terrestrial broadcast reception device 13 in FIG. 1) and a "digital terrestrial broadcast TV" group (group of programs received by the digital terrestrial broadcast reception device 15 in FIG. 1). When a channel belonging to the "digital terrestrial broadcast TV" group is being selected, the wording indicative of the selected channel is displayed.

On the right of the cursor 71 appears two-line information. The information may indicate the title of the program (e.g., movie "xxoo☐xx") currently broadcast on the selected channel 1, the name of the broadcast channel (e.g., NHK General), and the time slot of the broadcast (i.e., broadcast starting and broadcast ending times, such as 10:00 through 12:00 a.m.). These items of information are displayed on the basis of EPG data stored in the EPG data storage device 42. When another channel is selected, the title of the program and other items of information are similarly displayed on the right of the icon representing the selected channel. On the menu screen of FIG. 4, a network icon 58 denoting the network appears in the rightmost position of the category icon array R1.

Figure 5:
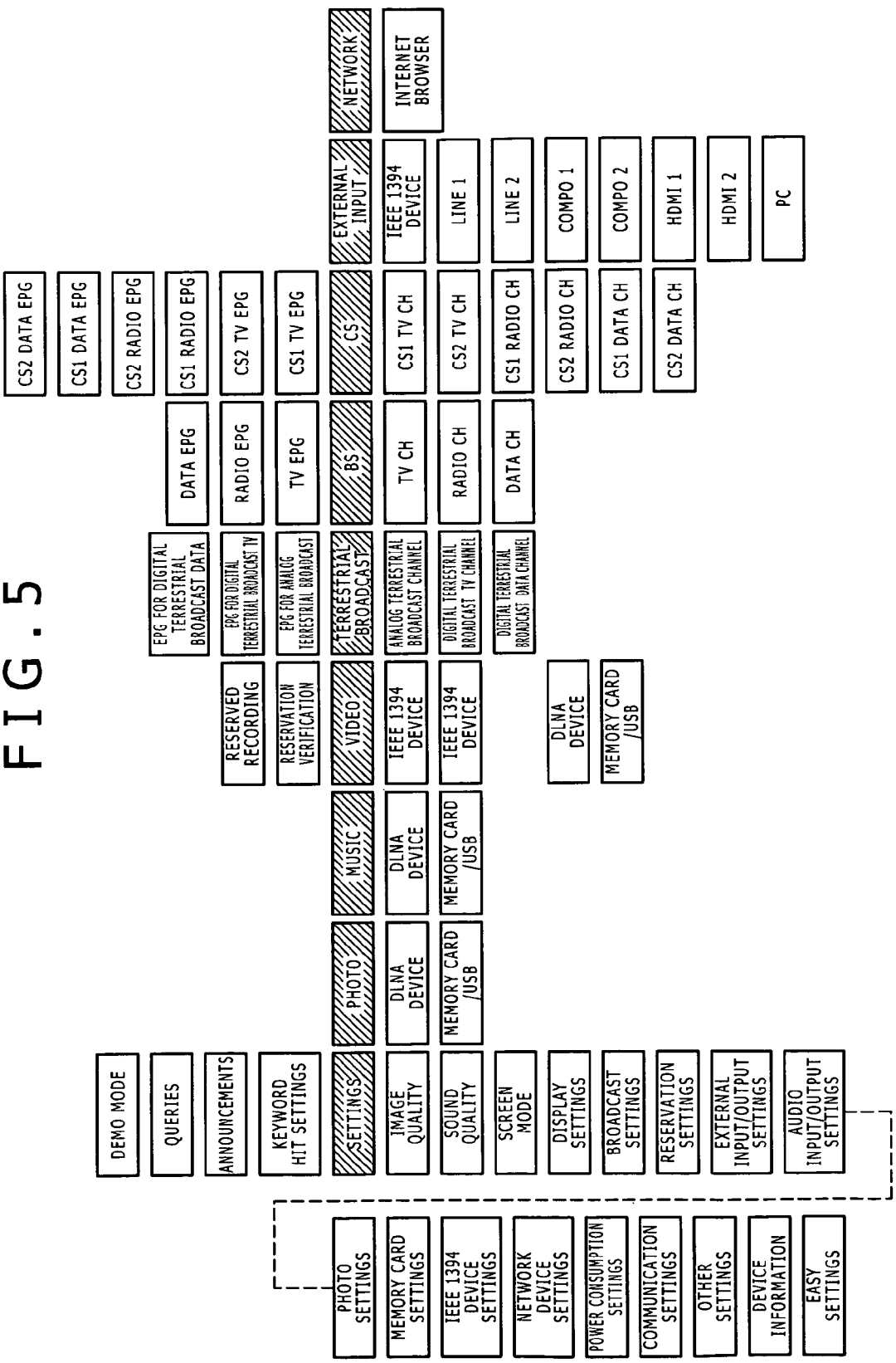
FIG. 5 is a schematic view showing a typical definition map.

FIG. 5 is a schematic view showing a typical definition map that defines how categories and their items are to be arrayed. The categories "Settings," "Photo," "Music," "Video," Terrestrial broadcast," "BS broadcast," "CS broadcast," "External input," and "Network" are arrayed from left to right, shown shaded.

The "Settings" category pertains to settings. This category includes the items, shown from the top down, of "Demo mode" selected in order to display a demo screen; "Queries" selected to display the contact information for queries; "Announcements" selected to display announcements from the manufacturer; and "Keyword hit settings" selected to enter a keyword by which to select one of the programs recommended by the DTV 1.

The "Settings" category also includes the items of "Image quality" selected so as to make image quality settings; "Sound quality" to make sound quality settings; "Screen mode" selected to make screen mode settings; "Display settings" selected to make display settings; "Broadcast settings" selected to make settings about the broadcast to be received; "Reservation settings" selected to make reservation settings; "External input/output settings" selected to make settings regarding the external devices connected to the DTV 1; and "Audio input/output settings" selected to make audio input/output settings.

The "Settings" category further includes the items of "Photo settings" selected in order to make settings about the display of still images; "Memory card settings" selected to make settings regarding the memory card 27; "IEEE 1394 device settings" selected to make settings about the devices connected via IEEE 1394 cables; "Network device settings" selected to make settings about the devices connected through the network; "Power consumption settings" selected to make power mode settings of the DTV 1; "Communication settings" selected to make communication function settings; "Other settings" selected to make other settings; "Device information" selected to display device information such as the manufacturing number of the DTV 1; and "Easy settings" selected to display a wizard that facilitates execution of the settings.

The "Photo" category pertains to the display of still images. This category includes the items, shown from the top down, of "DLNA device" selected in order to display on the display device 22 still images after acquiring them from a digital camera compatible with the DLNA (Digital Living Network Alliance) standard and connected to the DTV 1 through the network; and "Memory card/USB" selected to display on the display device 22 still images after acquiring them from the memory card 27 or from a digital camera connected through a USB cable.

The "Music" category pertains to music. This category includes the items, shown from the top down, of "DLNA device" selected in order to output from the speakers 24 pieces of music after acquiring them from a DLNA-compatible audio player connected to the DTV 1 through the network; and "Memory card/USB" selected to output from the speakers 24 pieces of music after acquiring them from the memory card 27 or from an audio player connected through a USB cable.

The "Video" category pertains to the recording of programs. This category includes the items, shown from the top down, of "Reserved recording" selected in order to set recording reservations; and "Reservation verification" selected to verify the established recording reservations.

The "Video" category also includes the items of "IEEE 1394 device" selected so as to record programs to a recording and reproducing apparatus connected through an IEEE 1394 cable, or to reproduce recorded programs from the connected recording and reproducing apparatus. For example, where a HDR and a DVHS device are connected to the DTV 1 via IEEE 1394 cables, the items for these recording and reproducing apparatuses are displayed under the "Video" category along with the items of "Reserved recording" and "Reservation verification."

The "Video" category further includes the items of "DLNA device" selected in order to record programs to a DLNA-compatible recording and reproducing apparatus connected to the DTV 1 through the network or to reproduce recorded programs from the connected recording and reproducing apparatus; and "Memory card/USB" selected to reproduce moving images from the memory card 27 or from a device connected through a USB cable.

The "Terrestrial broadcast" category pertains to analog and digital terrestrial broadcasts. This category includes the items, from the top down, of "EPG for digital terrestrial broadcast data" selected in order to display the listings of data broadcast programs; "EPG for digital terrestrial broadcast TV" selected to display the listings of digital terrestrial broadcast programs; and "EPG for analog terrestrial broadcast" selected to display the listings of analog terrestrial broadcast programs.

The "Terrestrial broadcast" category also includes the items of "Analog terrestrial broadcast channel" (channel icon) selected in order to view programs on a selected analog terrestrial broadcast channel; "Digital terrestrial broadcast TV channel" (channel icon) selected to view programs on a selected digital terrestrial broadcast channel; and "Digital terrestrial broadcast data channel" (channel icon) selected to view programs on a selected data broadcast channel.

The "BS broadcast" category pertains to BS digital broadcasts. This category includes the items, shown from the top down, of "Data EPG" selected in order to display the listings of data broadcast programs; "Radio EPG" selected to display the listings of radio broadcast programs; and "TV EPG" selected to display the listings of BS digital broadcast programs.

The "BS broadcast" category also includes the items of "TV channel" (channel icon) selected so as to view programs on a selected BS broadcast channel; "Radio channel" (channel icon) selected to listen to the radio on a selected radio broadcast channel; and "Data channel" (channel icon) selected to view programs on a selected data broadcast channel.

The "CS broadcast" category pertains to CS digital broadcasts. This category includes the items, shown from the top down, of "Data EPG" selected in order to display the listings of data broadcast programs; "Radio EPG" selected to display the listings of radio broadcast programs; and "TV EPG" selected to display the listings of CS digital broadcast programs.

The "CS broadcast" category also includes the items of "TV channel" (channel icon) selected so as to view programs on a selected CS broadcast channel; "Radio channel" (channel icon) selected to listen to the radio on a selected radio broadcast channel; and "Data channel" (channel icon) selected to view programs on a selected data broadcast channel.

The "External input" category pertains to the switching of input signals coming from external devices into the DTV 1. This category includes the items, shown from the top down, of "IEEE 1394 device" selected in order to choose the output from an external device connected through an IEEE 1394 cable. Illustratively, if a tuner device compatible with CS digital broadcasts is connected to the DTV 1 through an IEEE 1394 cable, the icon representing the connected tuner device is displayed under the "External input" category. Whereas the icons indicative of the HDR and DVHS connected via IEEE 1394 cables and capable of reproducing recorded programs are shown subsumed under the "Video" category, the icon representing the tuner device with no ability to reproduce recorded programs is shown belonging to the "External input" category.

The "External input" category also includes the items of "LINE 1" and "LINE 2" selected in order to choose the output from devices connected to LINE 1 and LINE 2 terminals; "Compo 1" and "Compo 2" selected to choose the output from devices connected to Composite 1 and Composite 2 terminals; "HDMI 1" and "HDMI 2" selected to choose the output from devices connected to HDMI 1 and HDMI 2 terminals; and "PC" selected to choose the output from a PC (personal computer).

The "Network" category pertains to various processes carried out when connection is established with the network. This category includes illustratively the item of "Internet browser" selected in order to start up a browser and to display web pages thereby.

Each of the items outlined above may have subsumed items. When a top-layer item is selected, the items subsumed under the selected item are displayed.

Figure 6:
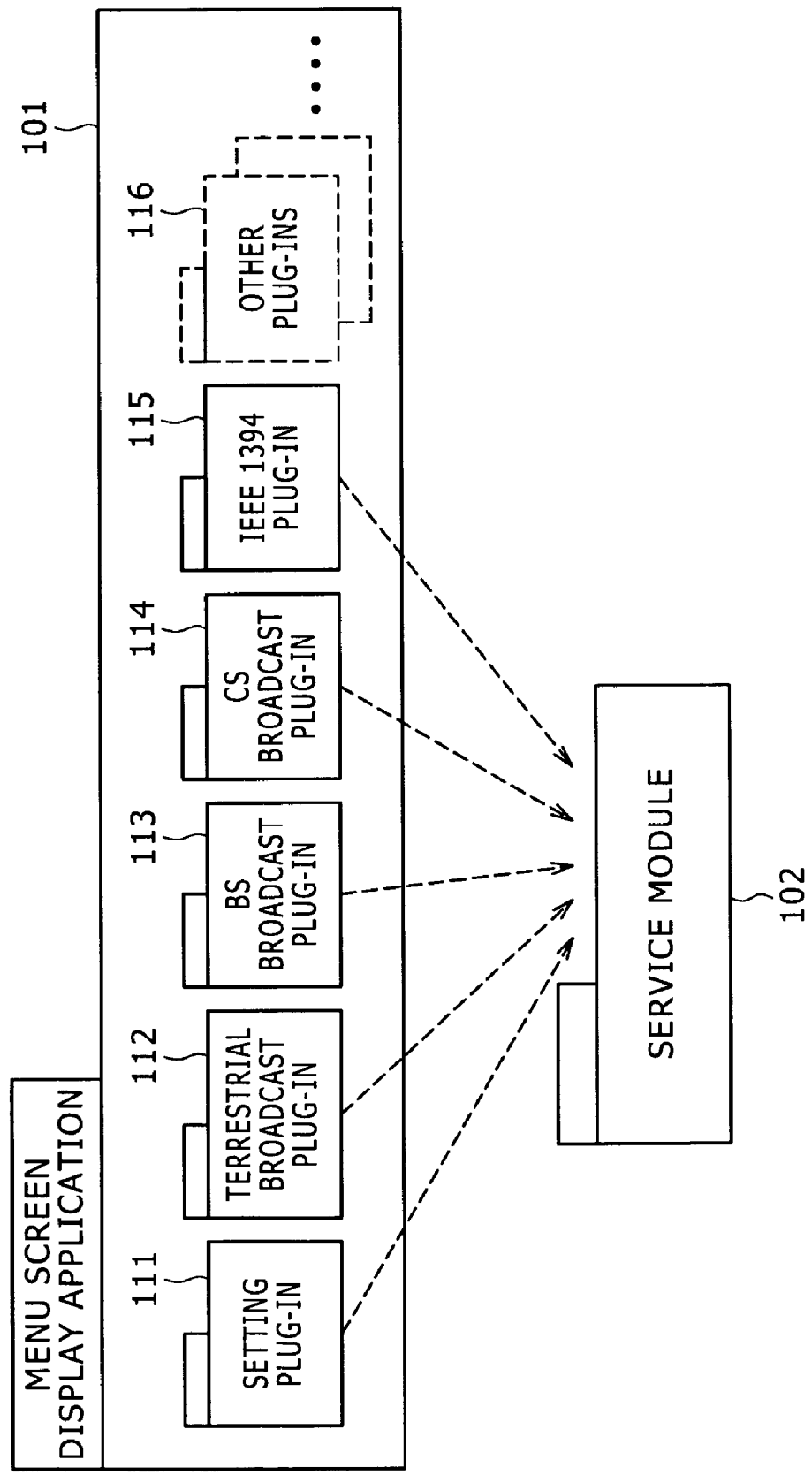
FIG. 6 is a schematic view showing typical software offered by the DTV.

FIG. 6 is a schematic view showing typical software (i.e., application program) offered by the DTV 1 so as to implement the display of the menu screen.

The DTV 1 offers a menu screen display application 101 and a service module 102. The menu screen display application 101 incorporates a setting plug-in 111, a terrestrial broadcast plug-in 112, a BS broadcast plug-in 113, a CS broadcast plug-in 114, an IEEE 1394 plug-in 115, and other plug-ins 116.

A plug-in is a software module which carries out the function associated with an item provided by the DTV 1 and which displays the icon representative of that item. In addition to the plug-ins shown in FIG. 6, the menu screen display application 101 illustratively incorporates other plug-ins 116 including a plug-in that implements functions related to recording reservations (i.e., plug-in that brings about the functions in effect when the "Reserved recording" or "Reservation verification" item in FIG. 5 is selected), and a plug-in that controls the DLNA device connected to the DTV 1 via the network (i.e., plug-in that brings about the functions in effect when the item of "DLNA device" FIG. 5 is selected).

The menu screen display application 101 controls the entire display of the menu screen. For example, the menu screen display application 101 displays a menu screen made up of category icons and item icons using data held in the display data storage device 41, and switches menu screen displays in response to the user's operations. Every time the user selects a category, the menu screen display application 101 notifies the corresponding plug-in of the user's operation.

The setting plug-in 111 controls the display of the menu screen when the "Settings" category is being selected. When notified by the menu screen display application 101 that the "Settings" category has been selected, the setting plug-in 111 displays the icons representative of the items subsumed under the selected category according to the layout in FIG. 5 using the data stored in the display data storage device 41. If one of the items is selected and if the selected item turns out to have further items subsumed thereunder, these lower-layer items are displayed.

The terrestrial broadcast plug-in 112 controls the display of the menu screen when the "Terrestrial broadcast" category is being selected. When notified by the menu screen display application 101 that the "Terrestrial broadcast" category has been selected, the terrestrial broadcast plug-in 112 displays the icons representative of the items subsumed under the selected category according to the layout in FIG. 5 using the data stored in the display data storage device 41. If one of the items is selected and if the selected item turns out to have further items subsumed thereunder, these lower-layer items are displayed.

For example, the terrestrial broadcast plug-in 112 queries the service module 102 about information on the programs to be broadcast on analog and digital terrestrial broadcast channels. Given the output from the service module 102 responding to the query, the terrestrial broadcast plug-in 112 displays the information about the programs. The response from the service module 102 includes such information as program titles, broadcast channel names, and broadcast time slots.

The BS broadcast plug-in 113 controls the display of the menu screen when the "BS broadcast" category is being selected. When notified by the menu screen display application 101 that the "BS broadcast" category has been selected, the BS broadcast plug-in 113 displays the icons representative of the items subsumed under the selected category according to the layout in FIG. 5 using the data stored in the display data storage device 41. If one of the items is selected and if the selected item turns out to have further items subsumed thereunder, these lower-layer items are displayed.

For example, the BS broadcast plug-in 113 queries the service module 102 about information on the programs to be broadcast on BS broadcast channels. Given the output from the service module 102 responding to the query, the BS broadcast plug-in 113 displays the information about the programs.

The CS broadcast plug-in 114 controls the display of the menu screen when the "CS broadcast" category is being selected. When notified by the menu screen display application 101 that the "CS broadcast" category has been selected, the CS broadcast plug-in 114 displays the icons representative of the items subsumed under the selected category according to the layout in FIG. 5 using the data stored in the display data storage device 41. If one of the items is selected and if the selected item turns out to have further items subsumed thereunder, these lower-layer items are displayed.

For example, the CS broadcast plug-in 114 queries the service module 102 about information on the programs to be broadcast on CS broadcast channels. Given the output from the service module 102 responding to the query, the CS broadcast plug-in 114 displays the information about the programs.

The IEEE 1394 plug-in 115 controls the IEEE 1394 devices connected to the DTV 1 via IEEE 1394 cables in accordance with the user's operations. When any category applicable to IEEE 1394 devices is selected, the IEEE 1394 plug-in 115 displays the icons representative of the connected IEEE 1394 devices belonging to that category.

For example, where an IEEE 1394 device is connected to the DTV 1 through an IEEE 1394 cable, the IEEE 1394 plug-in 115 acquires from the connected device information about the functions offered by the device. If the connected IEEE 1394 device is a HDR or DVHS capable of reproducing images (e.g., program images), then the IEEE 1394 plug-in 115 registers the connected device in association with the "Video" category. If the connected IEEE 1394 device is a tuner or the like with no capability to reproduce images, then the IEEE 1394 plug-in 115 registers the connected device in conjunction with the "External input" category.

When notified by the menu screen display application 101 that the "Video" category is currently selected, the IEEE 1394 plug-in 115 displays on the menu screen the item icons representative of the IEEE 1394 devices such as the HDR and DVHS subsumed under the selected category through the use of the data stored in the display data storage device 41.

Likewise, when notified by the menu screen display application 101 that the "External input" category is currently selected, the IEEE 1394 plug-in 115 displays on the menu screen the item icons indicative of the IEEE 1394 devices such as the tuner subsumed under the selected category through the use of the data held in the display data storage device 41.

The service module 102 manages the data and settings used to display the menu screen, providing the applications and plug-ins involved with relevant data and notifying them of the applicable settings. Illustratively, the service module 102 offers the program information stored in the EPG data storage device 42 to the terrestrial broadcast plug-in 112, BS broadcast plug-in 113, and CS broadcast plug-in 114.

The software structured as described above is carried out illustratively by the control device 11 and display image generation and output device 21, whereby the menu screen is displayed.

Figure 7:
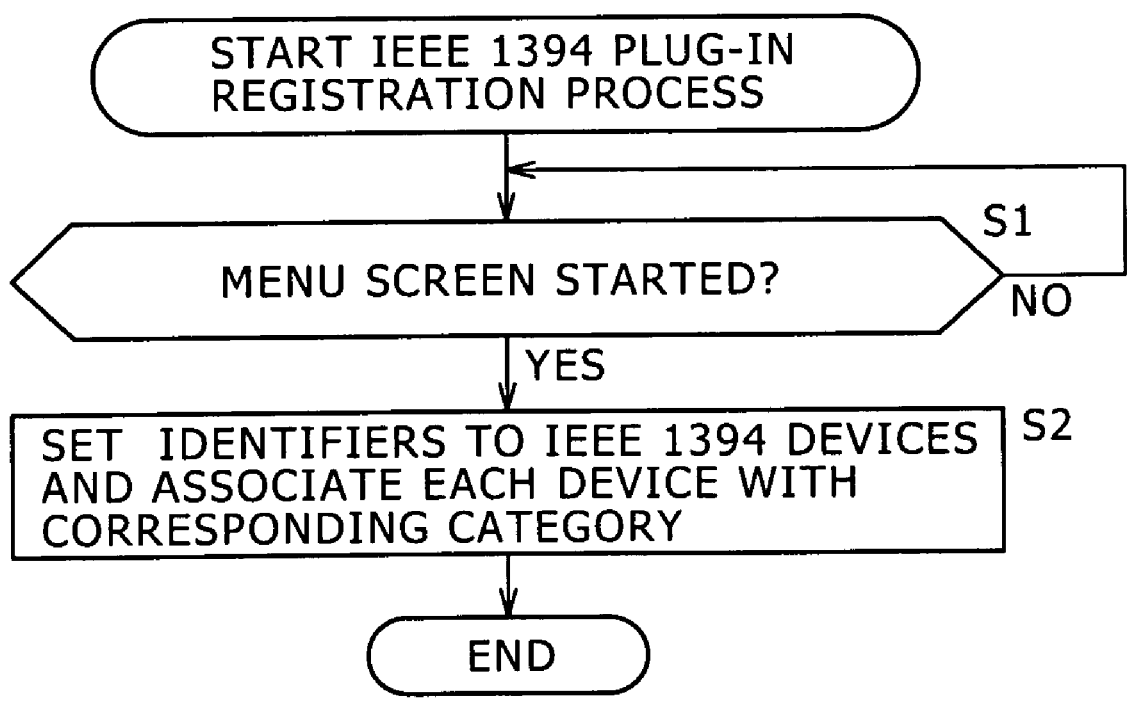
FIG. 7 is a flowchart of steps constituting an IEEE 1394 plug-in registration process.

What follows is a description of a process performed by the DTV 1 (i.e., by IEEE 1394 plug-in 115). First to be described in reference to the flowchart of FIG. 7 is what the IEEE 1394 plug-in 115 does when registering an IEEE 1394 device in conjunction with a suitable category depending on the function provided by the device.

In step S1, the IEEE 1394 plug-in 115 checks to determine whether or not the menu screen is started. The IEEE 1394 plug-in 115 waits for the menu screen to be started up. For example, when the user operates the home key on the remote controller 31, the menu screen display application 101 displays the menu screen and notifies the IEEE 1394 plug-in 115 of the start-up of the screen.

If in step S1 the IEEE 1394 plug-in 115 determines that the menu screen has been started, the plug-in 115 goes to step S2. In step S2, the IEEE 1394 plug-in 115 sets identifiers to the IEEE 1394 devices connected to the DTV 1 via IEEE 1394 cables and registers the connected devices in association with appropriate categories. For example, the IEEE 1394 plug-in 115 sets an identifier ID1 to the device belonging to the "Video" category and an identifier ID2 to the device belonging to the "External input" category.

From the IEEE 1394 devices connected to the DTV 1 via IEEE 1394 cables, the IEEE 1394 plug-in 115 acquires information about the functions offered by the connected devices. Where the connected IEEE 1394 devices are made up of such devices as a HDR, a DVHS, a BDR (Blu-ray disc recorder), and a camcorder capable of reproducing recorded programs, these devices are each assigned an ID1 indicating that they are subsumed under the "Video" category.

Where the connected IEEE 1394 devices have no ability to reproduce recorded programs (e.g., tuner device), the IEEE 1394 plug-in 115 assigns ID2 to each of the connected devices indicating that they belong to the "External input" category.

With the above-described steps executed as described, the IEEE 1394 devices assigned to the items displayed by a single plug-in (i.e., IEEE 1394 plug-in 115) are registered in conjunction with a plurality of categories.

Figure 8:
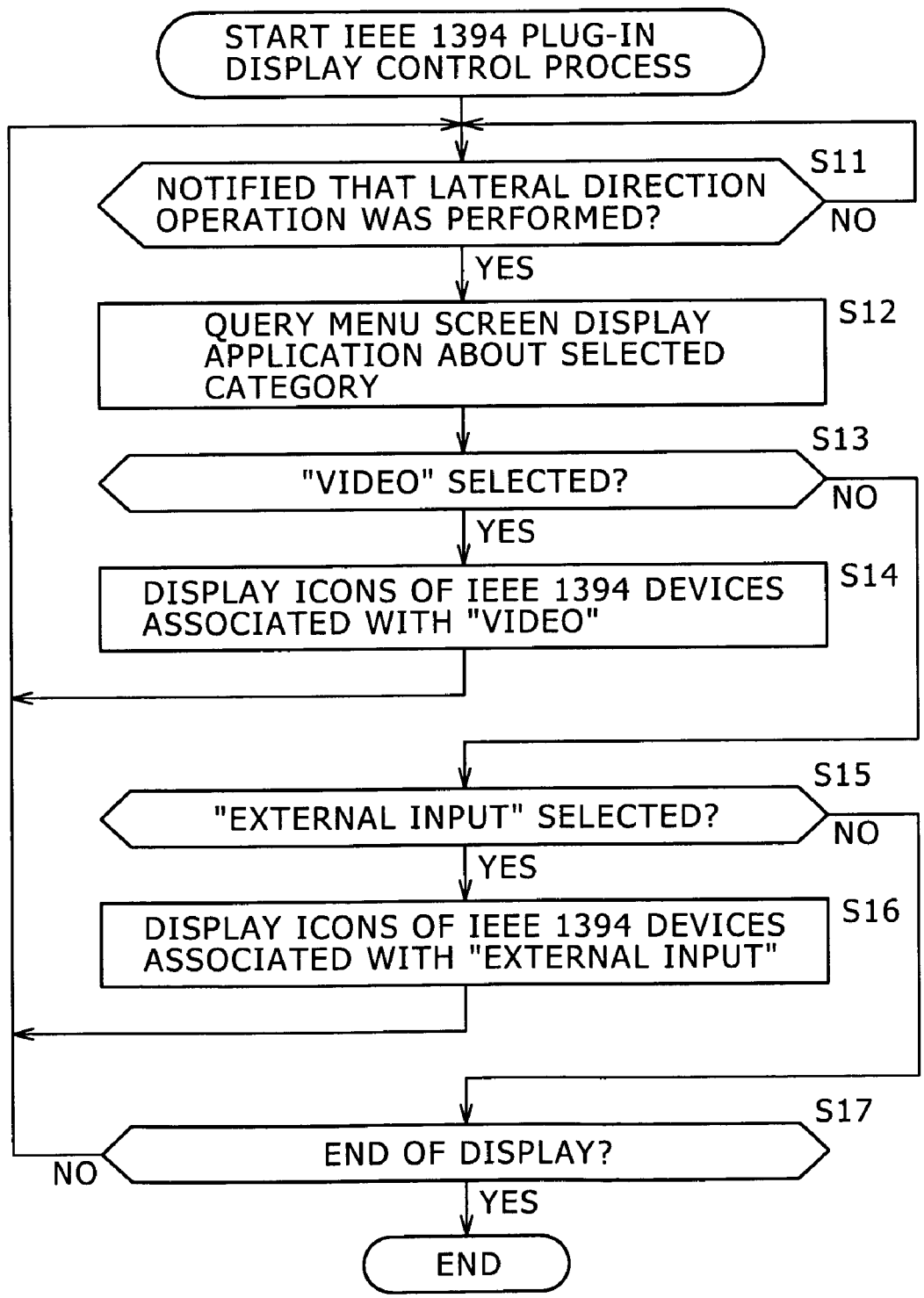
FIG. 8 is a flowchart of steps constituting an IEEE 1394 plug-in display control process.

Described below with reference to the flowchart of FIG. 8 is a process performed by the IEEE 1394 plug-in 115 displaying the icons representative of IEEE 1394 devices.

In step S11, the IEEE 1394 plug-in 115 checks to determine whether it is notified of a lateral direction operation that has been made. The plug-in 115 waits for that notice. More specifically, when the user operates the right or left key on the remote controller 31, the menu screen display application 101 notifies each plug-in of the user's operation.

If in step S11 the IEEE 1394 plug-in 115 determines that it is notified of the lateral direction operation, the plug-in 115 goes to step S12. In step S12, the IEEE 1394 plug-in 115 queries the menu screen display application 101 about the category selected anew as a result of the lateral direction operation.

In step S13, the IEEE 1394 plug-in 115 checks to determine whether or not the "Video" category is selected based on the output from the menu screen display application 101 responding to the query. In response to the query from the IEEE 1394 plug-in 115, the menu screen display application 101 signals which category has been selected.

If in step S13 the IEEE 1394 plug-in 115 determines that the "Video" category is currently selected, the plug-in 115 goes to step S14. In step S14, in accordance with the correspondence set in the process of FIG. 7 between the categories and the IEEE 1394 devices, the IEEE 1394 plug-in 115 displays the icons indicative of the IEEE 1394 devices associated with the "Video" category. These devices, such as the HDR and DVHS capable of reproducing recorded programs, are each assigned the identifier ID1 that identifies the "Video" category they belong to.

Figure 9:
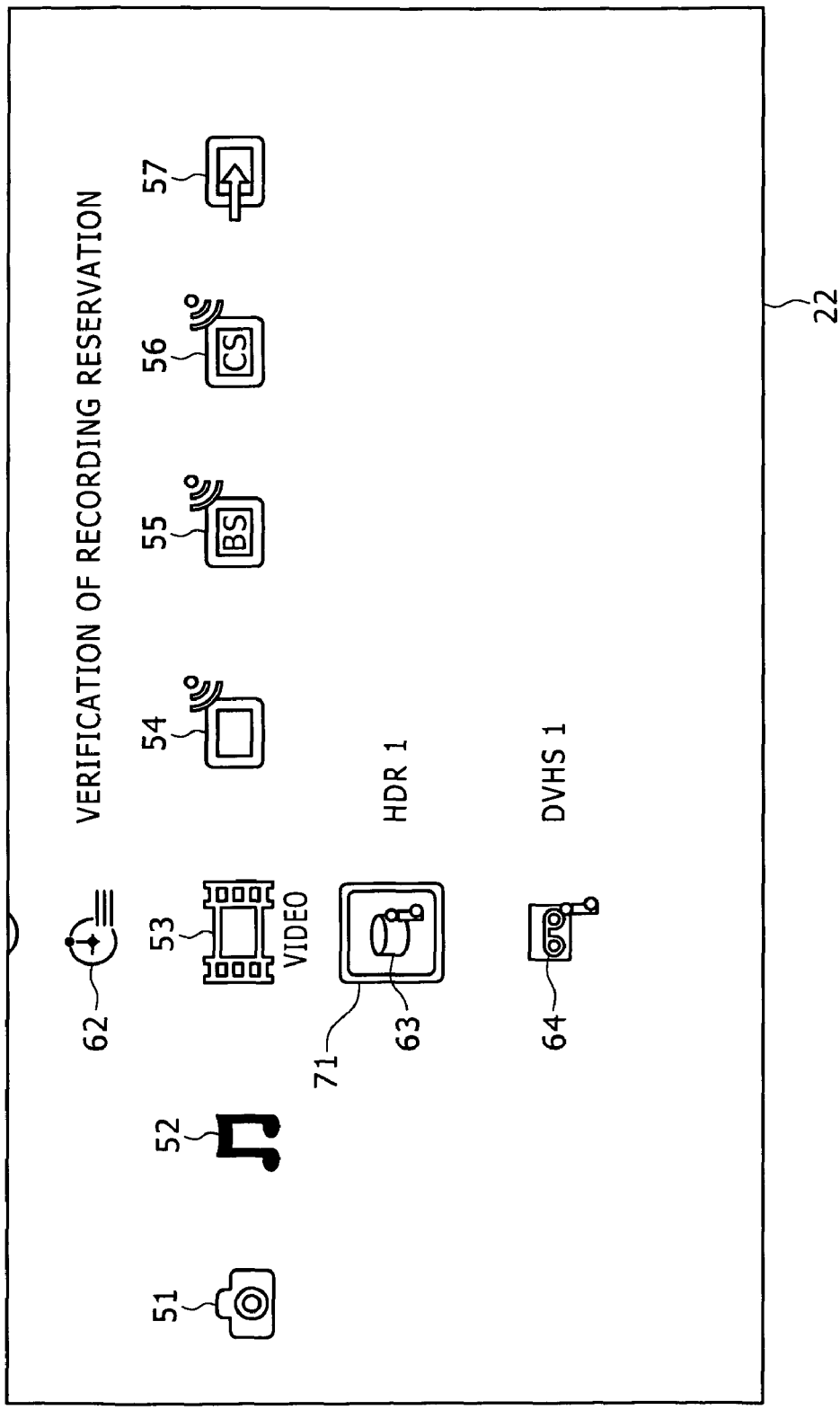
FIG. 9 is a schematic view of another typical menu screen.

FIG. 9 is a schematic view of a typical menu screen showing an icon representative of the HDR and an icon indicative of the DVHS. These are IEEE 1394 devices.

As shown in FIG. 9, when the user selects the video icon 53 by operating the right or left key, the item icon 63 representing the HDR and the item icon 64 denoting the DVHS are arrayed in the direction perpendicular to the category icon array. In the example of FIG. 9, the letters "HDR 1" appear next to the item icon 63 and "DVHS 1" next to the item icon 64.

If the user selects the item icon 63 or 64 from the screen of FIG. 9 and pushes the enter key on the remote controller 31, the IEEE 1394 plug-in 115 displays the items subsumed under the selected item as shown in FIG. 3. Starting from any one of the displayed lower-layer items, the user may illustratively reproduce recorded program images out of the corresponding IEEE 1394 device.

The screen shown in FIG. 9 is displayed not only when the lateral direction operation is performed by the user but also when the menu screen is started up with the "Video" category selected.

Returning to the explanation of FIG. 8, the IEEE 1394 plug-in 115 goes back to step S11 after displaying the icons representative of the IEEE 1394 devices subsumed under the "Video" category. The subsequent steps are then repeated.

If in step S13 the IEEE 1394 plug-in 115 determines that the "Video" category is not selected, the plug-in 115 goes to step S15. In step S15, the IEEE 1394 plug-in 115 checks to determine whether or not the "External input" category is current selected.

If in step S15 the IEEE 1394 plug-in 115 determines that the "External input" category is being selected, the plug-in 115 goes to step S16. In step S16, in accordance with the correspondence set in the process of FIG. 7 between the categories and the IEEE 1394 devices, the IEEE 1394 plug-in 115 displays the icons indicative of the IEEE 1394 devices associated with the "External input" category. These devices, such as the tuner device incapable of reproducing recorded programs, are each assigned the identifier ID2 that identifies the "External input" category they belong to.

Figure 10:
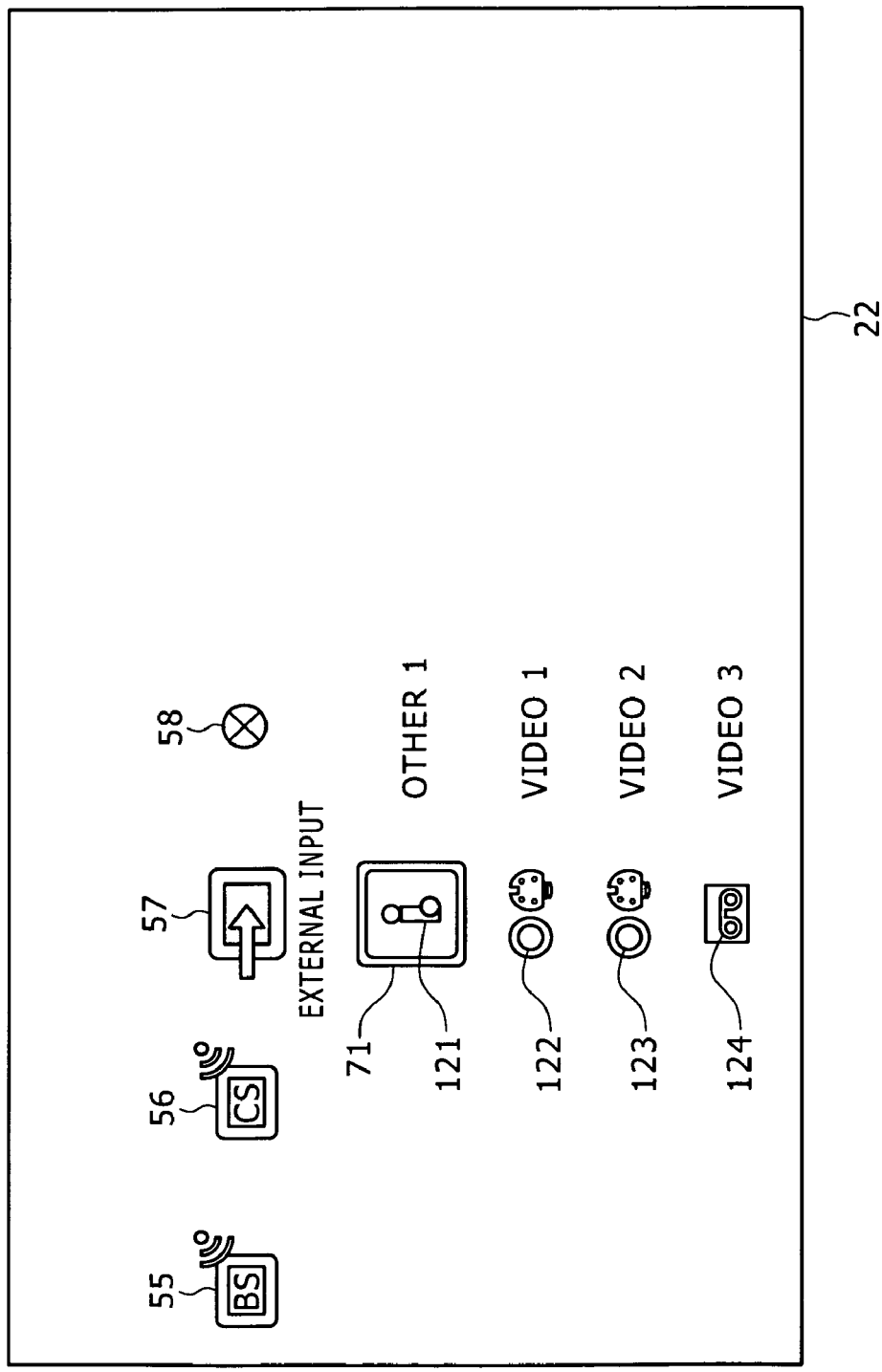
FIG. 10 is a schematic view of another typical menu screen.

FIG. 10 is a schematic view of a typical menu screen showing an icon representative of the tuner, an IEEE 1394 device. As shown in FIG. 10, when the user selects the external input icon 57 by operating the right or left key, an item icon 121 representing the tuner is displayed in the direction perpendicular to the category icon array. In the example of FIG. 10, the letters "OTHER 1" appear next to the item icon 121. Under the item icon 121 appear an item icon 122 indicating the item "LINE 1," an item icon 123 denoting the item "LINE 2," and an item icon 124 representing the item "Compo 1." These items are shown arrayed in FIG. 5.

For example, when the user selects the item icon 121 from the screen of FIG. 10 and pushes the enter key on the remote controller 31, the IEEE 1394 plug-in 115 displays the items subsumed under the item "OTHER 1" (tuner device) as shown in FIG. 3.

The screen shown in FIG. 10 is displayed not only when the lateral direction operation is performed by the user but also when the menu screen is started up with the "External input" category selected.

Returning to the explanation of FIG. 8, the IEEE 1394 plug-in 115 goes back to step S11 after displaying the icons representative of the IEEE 1394 devices subsumed under the "External input" category. The subsequent steps are then repeated.

If in step S15 the IEEE 1394 plug-in 115 determines that the "External input" category is not selected, the plug-in 115 goes to step S17. In step S17, the IEEE 1394 plug-in 115 checks to determine whether or not the menu screen display is to be terminated.

If in step S17 the IEEE 1394 plug-in 115 determines that the menu screen display is not to be terminated, the plug-in 115 goes back to step S11 and repeats the subsequent steps. If it is determined in step S17 that the menu screen display is to be terminated because of the user's instruction to, say, display another screen, then the IEEE 1394 plug-in 115 terminates the process of FIG. 8.

Figure 11:
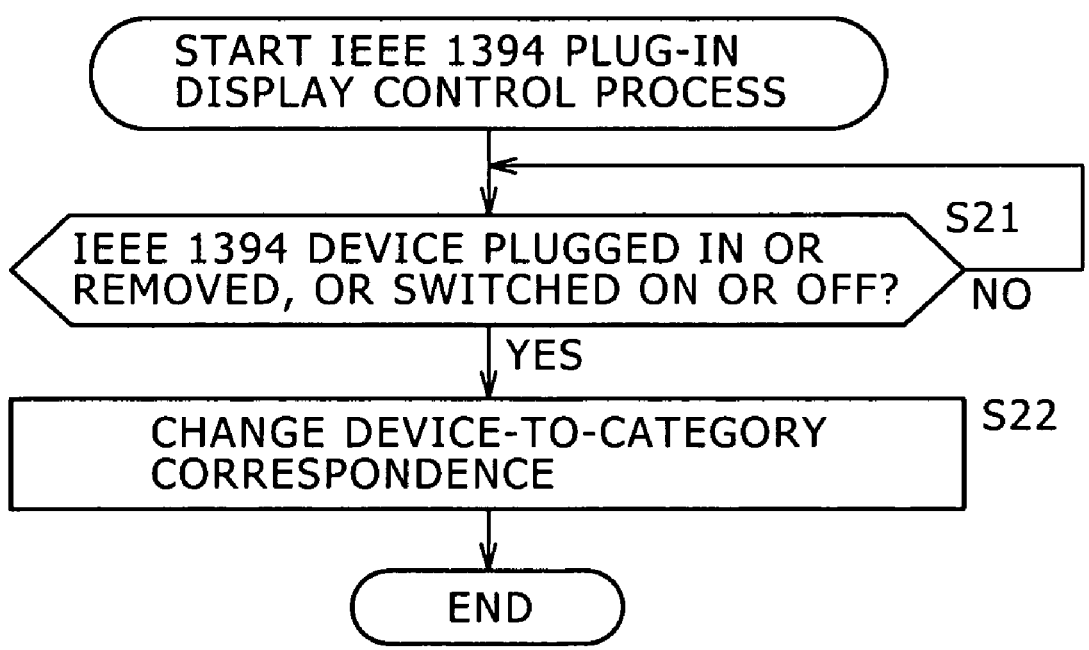
FIG. 11 is a flowchart of steps constituting another IEEE 1394 plug-in display control process.

Described below with reference to the flowchart of FIG. 11 is a process performed by the IEEE 1394 plug-in 115 when the plug-in 115 changes the correspondence between the IEEE 1394 devices and the categories and causes the changed correspondence to be reflected on the menu screen display.

In step S21, the IEEE 1394 plug-in 115 monitors the status of the IEEE 1394 devices being connected through the external input/output interface 28. Specifically, the IEEE 1394 plug-in 115 checks to determine whether any IEEE 1394 device is plugged in or removed or any connected IEEE 1394 device is switched on or off.

In step S21, the IEEE 1394 plug-in 115 waits for any IEEE 1394 device to be plugged in or removed or for any connected IEEE 1394 device to be switched on or off. If any one of these operation is detected, step S22 is reached.

In step S22, the IEEE 1394 plug-in 115 changes the correspondence between the configured IEEE 1394 devices and their categories and causes the changed correspondence to be reflected on the display.

Illustratively, if a new IEEE 1394 device is connected or if a deactivated IEEE 1394 device is switched on, the IEEE 1394 plug-in acquires from the newly connected device information about the function offered by the device, and registers the device in association with the appropriate category corresponding to the device function. When the appropriate category is selected, the IEEE 1394 plug-in 115 displays the icon indicative of the newly connected IEEE 1394 device.

If any connected IEEE 1394 device is removed or if an active IEEE 1394 device is switched off, the IEEE 1394 plug-in 115 deletes the correspondence between the device in question and its category. The IEEE 1394 plug-in 115 proceeds to update and register the correspondence the newly configured IEEE 1394 devices and their categories.

Figure 12:
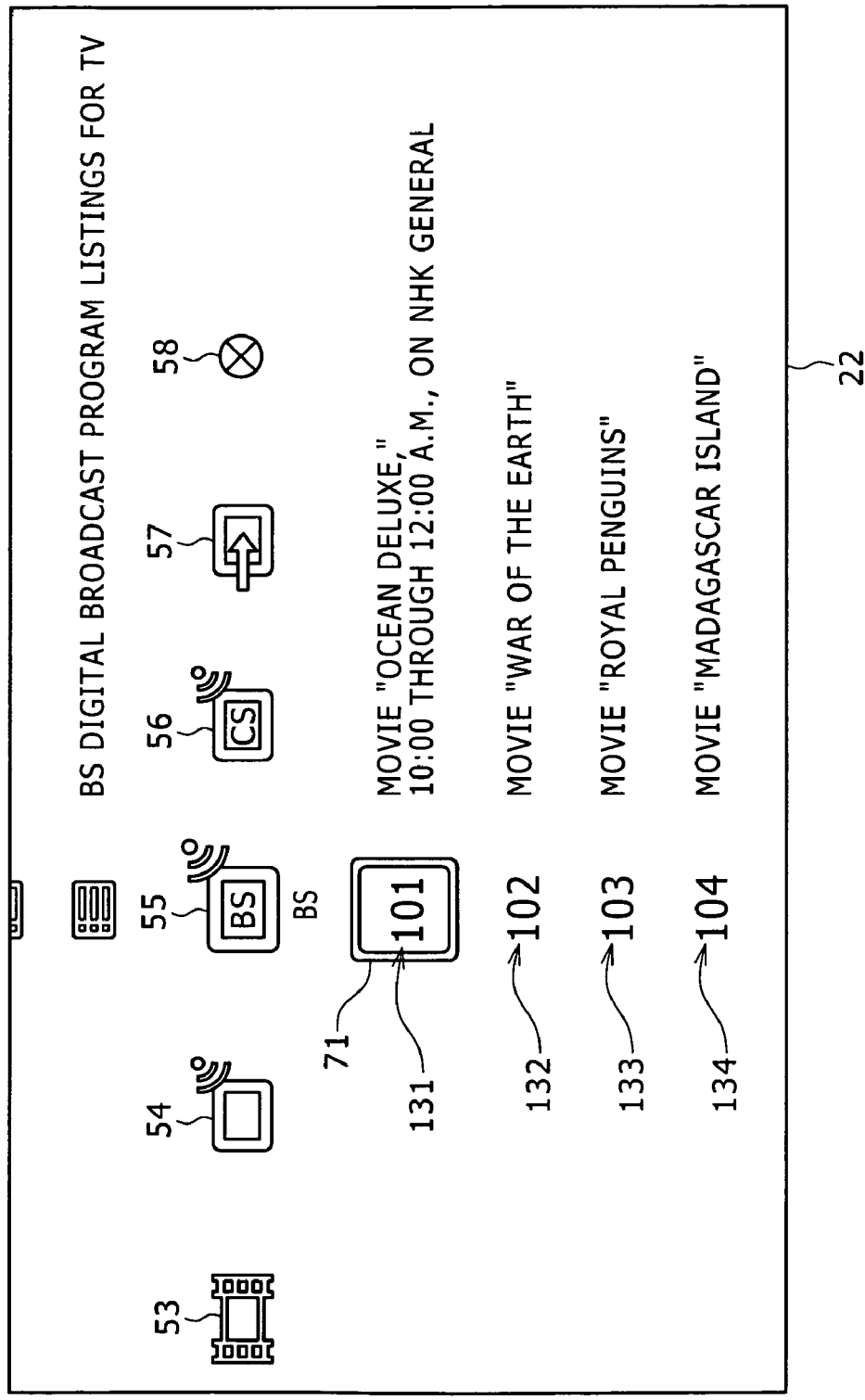
FIG. 12 is a schematic view of another typical menu screen.

The device-to-category correspondence registration is updated illustratively as shown in FIG. 12, i.e., with or without the main screen showing any icon representative of an IEEE 1394 device. Illustratively, suppose that with the menu screen of FIG. 12 displayed, the connected tuner (IEEE 1394 device) is removed and the "External input" category is selected by the user performing the lateral direction operation. In that case, the item icon 121 (FIG. 10) that was displayed to represent the tuner no longer appears on the screen.

In the example of FIG. 12, the "BS broadcast" category is shown selected. Channel icons 131 through 134 representing channels 101, 102, 103 and 141, respectively, are arrayed in the direction perpendicular to the category icon array. The channel icon 131 is shown selected by the cursor 71.

On the right of the channel icon 131 appears information about the program to be broadcast on channel 101. As indicated, the program is titled "Ocean deluxe," the name of the channel is "NHK general," and the broadcast time slot is 10:00 through 12:00 a.m. Next to the other channel icons also appears information such as program titles.

For purposes of display control, as described above, the DTV 1 can classify each of the plug-in-based items into any of a plurality of categories and display icons representing these items.

If a new category is added, the correspondence between the items and the categories can be changed easily. For example, if the "IEEE 1394 device" category is added anew, the IEEE 1394 plug-in 115 causes the HDR and DVHS under the "Video" category and the tuner device under the "External input" category to correspond with the newly added "IEEE 1394 device" category. When the "IEEE 1394 device" category is later selected, the icons representing the IEEE 1394 devices are all displayed under the selected category.

In the foregoing description, the items of the devices connected via IEEE 1394 cables were show to be displayed in conjunction with a plurality of categories. Alternatively, the items assigned to any other single plug-in for icon control purposes may be classified into a plurality of categories.

In FIG. 5, for example, the items belonging to the "Settings" category were shown ranging from the "Demo mode" item to the "Easy settings" item, and the icons indicative of these items were described as controlled by the setting plug-in 111. Alternatively, the "Photo settings" item under the "Settings" category may be classified into the "Photo" category, and the "Network device settings" item under the same category may be grouped into the "Network" category.

As another alternative, a single item may be classified into a plurality of categories. For example, the HDR (IEEE 1394 device) may be classified into both the "Video" category and the "External input" category. The icon representing the HDR may then be displayed not only when the "Video" category is selected but also when the "External input" category is chosen.

It might happen that a "Hard disk" category is newly added and that the icons representing music, video, and still image contents (i.e., items) recorded on the hard disk drive are classified into the newly added category for collective icon display (the icons are designed to be operated for content reproduction). In that case, the music content may also be grouped into the "Music" category, the video content into the "Video" category, and the still image content into the "Photo" category. Illustratively, the icon representing the music content in the above setup may be displayed not only when the "Hard disk" drive is selected but also when the "Music" category is chosen.

In the manner described above, the items assigned to a single plug-in for icon display control may also be displayed under any one of a variety of categories.

The series of steps or processes described above may be executed either by hardware or by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

Figure 13:
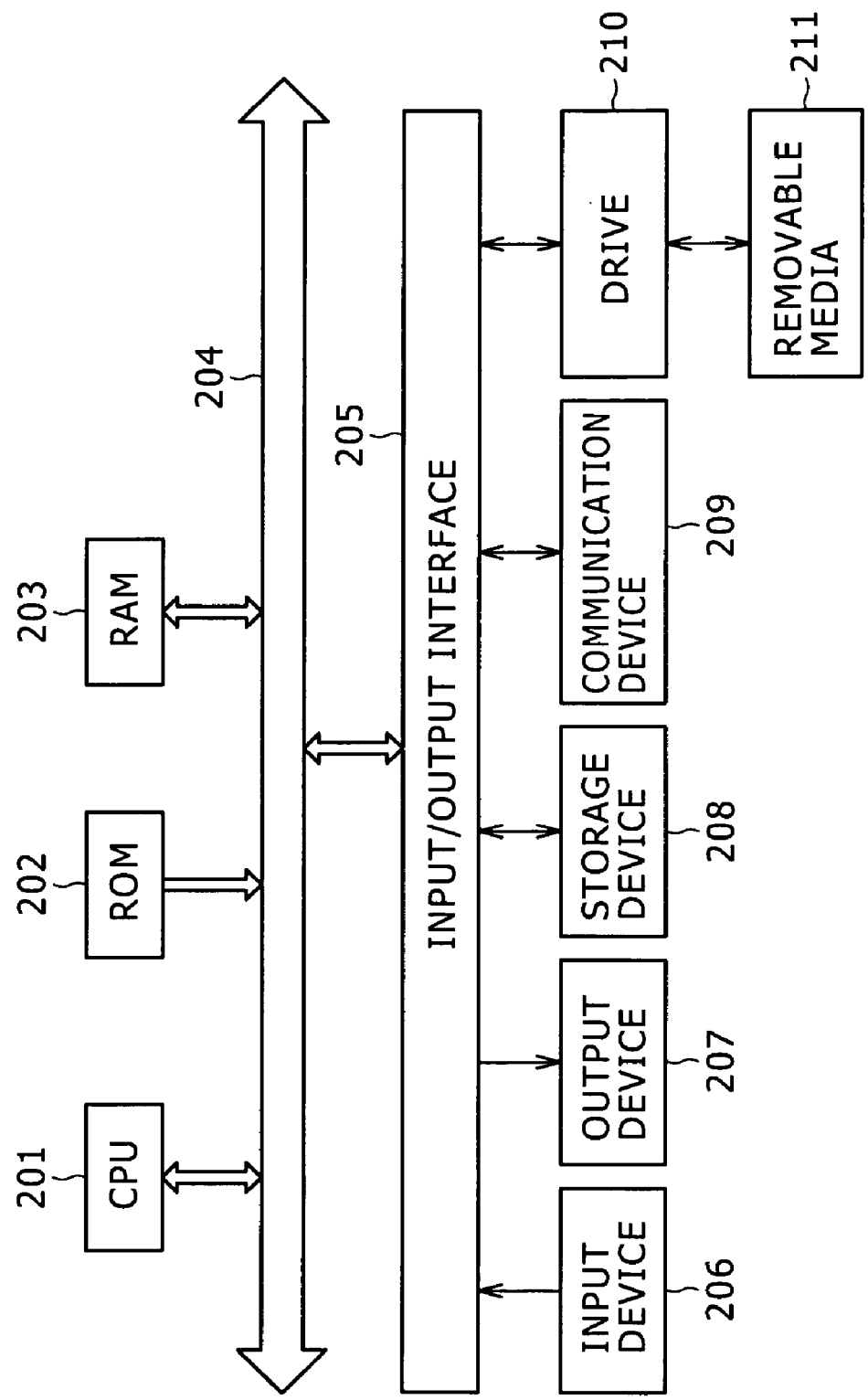
FIG. 13 is a block diagram showing a typical structure of a personal computer.

FIG. 13 is a block diagram showing a typical structure of a personal computer that carries out the programs constituting the above-described processes. A CPU 201 performs diverse processes in accordance with the programs held in a ROM 202 or in a storage device 208. A RAM 203 accommodates the programs or data being executed or operated on by the CPU 201 as needed. The CPU 201, ROM 202, and RAM 203 are interconnected by a bus 204.

The CPU 201 is also connected with an input/output interface 205 via the bus 204. The input/output interface 205 is connected to an input device 206 made up of such as a keyboard, a mouse and a microphone, and to an output device 207 composed of a display device and speakers and so on. The CPU 201 carries out its processing in response to commands input through the input device 206, and sends the result of the processing to the output device 207.

The storage device 208 connected to the input/output interface 205 is illustratively constituted by a hard disk drive that holds the programs to be executed and the data to be operated on by the CPU 201. A communication device 209 conducts communications with an external apparatus over the network such as the Internet or a local area network.

Programs may be acquired through the communication device 209 and stored into the storage device 208.

A drive 210 connected to the input/output interface 205 may be loaded with one of removable media 211 such as a magnetic disk, an optical disk, a magneto-optical disk, or a semiconductor memory and may acquire programs and data from the loaded medium being driven. The programs and data thus acquired are transferred as needed to the storage device 208 for storage.

As shown in FIG. 13, computer-installable, computer-executable programs designed to perform the above-described processes may be retained on the removable media 211 as a package media including the magnetic disk (including flexible disks), optical disk (including CD-ROM (compact disc read-only memory) and DVD (digital versatile disc)), magneto-optical disk, or semiconductor memory; or in the ROM 202 or on the hard disk drive constituting the storage device 208 where the programs are stored temporarily or permanently. The programs may be recorded to the storage medium via the communication device 209 serving as an interface including a router or a modem and through wired or wireless communication media such as local area networks, the Internet, and digital satellite broadcasts.

In this specification, the steps which describe the programs stored on the program storage medium represent not only the processes that are to be carried out in the depicted sequence (i.e., on a time series basis) but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. A computer-readable medium for storing a program for controlling a display control apparatus, wherein the program comprises:

an application module, storing a set of instructions that when executed, displays a plurality of first icons each representing a category; and a plurality of plug-in modules each corresponding to an item represented by a second icon, wherein each of the plurality of plug-in modules acquires information associated with a function offered by each item and registers each item according to an appropriate category corresponding to the function offered;

wherein one of said plurality of plug-in modules, at start up, determines when the menu screen has been started, determines which items are connected, and assigns a first identifier, identifying a first category, to each item that is capable of reproducing recorded programs, and assigns a second identifier, identifying a second category, to each connected item that have no ability to reproduce recorded programs and associates each item represented by each second icon assigned thereto with the categories; and wherein, if one of the categories represented by said first icons is selected, the one plug-in module acquires connected device information regarding a function offered by one or more items, and if the selected category is found associated with the one or more items represented by the second icon assigned to said one plug-in module, then said one plug-in module displays the second icon representing the item belonging to the selected category such that each of one or more second icons are displayed with a selected first icon corresponding to said plug-in module.

2. The computer-readable medium according to claim 1, wherein, if said plurality of first icons are displayed in an array in a given direction by said application module, then said one of said plurality of plug-in modules displays said second icons in an array in the direction perpendicular to the direction in which said first icons are arrayed on the display.

3. The computer-readable medium according to claim 1, wherein, if the items assigned to said one of said plurality of plug-in modules represent external devices connected via an IEEE 1394 cable each, then said one plug-in module associates the item of a first external device capable of reproducing contents with a first category covering content reproduction, and associates the item of a second external device incapable of reproducing contents with a second category covering other external devices.

4. The computer-readable medium according to claim 3, wherein, if a third category represented by one of said first icons is added to cover the external devices connected via an IEEE 1394 cable each, then said one plug-in module associates the items of said first and said second external devices with said third category.

5. A display control method for use with a display control apparatus having an application configured to display a plurality of first icons each representing a category, and a plurality of plug-ins each corresponding to an item represented by a second icon, said display control method comprising the steps of:

causing one of said plurality of plug-ins, at start up, to determine when the menu screen has been started, determines which items are connected, and assigns a first identifier, identifying a first category, to each item that is capable of reproducing recorded programs, and assigns a second identifier, identifying a second category, to each connected item that have no ability to reproduce recorded programs and to associate the item assigned thereto with the categories, wherein the one of said plurality of plug-ins acquires information associated with a function offered by each of the items for registering each item according to an appropriate category corresponding to the function offered; and if one of the categories represented by said first icons is selected, one plug-in module acquires connected device information regarding a function offered by the item, and if the selected category is found associated with the item assigned to said one plug-in, then causing said one plug-in to display the second icon representing the item belonging to the selected category such that each of one or more second icons are displayed with a selected first icon corresponding to said plug-in module based on the set identifier.

6. A computer-readable medium for storing a program for controlling a processor to implement a method for causing a computer to carry out a procedure for controlling a display control apparatus having an application configured to display a plurality of first icons each representing a category, and a plurality of plug-ins each corresponding to an item represented by a second icon, said program consisting of instructions to control said processor to perform the method comprising:

causing one of said plurality of plug-ins, at start up, to determine when the menu screen has been started, determines which items are connected, and assigns a first identifier, identifying a first category, to each item that is capable of reproducing recorded programs, and assigns a second identifier, identifying a second category, to each connected item that have no ability to reproduce recorded programs and to associate the item assigned thereto with the categories, wherein the one of said plurality of plug-ins acquires information associated with a function offered by each of one or more items for registering each of the one or more items according to an appropriate category corresponding to the function offered; and if one of the categories represented by said first icons is selected, the one plug-in module acquires connected device information regarding a function offered by each of the one or more items, and if the selected category is found associated with the one or more items assigned to said one plug-in, then causing said one plug-in to display the one or more second icons representing the one or more items belonging to the selected category such that the displayed second icons are displayed with a selected first icon corresponding to said plug-in module based on the set identifier.

* * * * *